United States Patent
Otani et al.

(10) Patent No.: US 7,045,915 B2
(45) Date of Patent: May 16, 2006

(54) POWER SUPPLY UNIT HAVING MULTIPLE POWER SUPPLY OUTPUTS

(75) Inventors: Kenji Otani, Kyoto (JP); Kiyotaka Umemoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 380 days.

(21) Appl. No.: 10/441,436

(22) Filed: May 20, 2003

(65) Prior Publication Data

US 2003/0222506 A1    Dec. 4, 2003

(30) Foreign Application Priority Data

May 29, 2002    (JP)    ............................. 2002-155974

(51) Int. Cl.
*H02J 4/00*    (2006.01)

(52) U.S. Cl. ........................... 307/75; 307/43; 307/86; 361/30; 361/93.8

(58) Field of Classification Search ................. 361/30, 361/93.8; 307/43, 86, 75
See application file for complete search history.

(56) References Cited

U.S. PATENT DOCUMENTS

| | | | | |
|---|---|---|---|---|
| 4,292,543 A | * | 9/1981 | Reed, Sr. ...................... | 307/35 |
| 5,994,790 A | * | 11/1999 | Nagashima et al. ........ | 307/10.1 |
| 6,121,693 A | * | 9/2000 | Rock ............................. | 307/18 |
| 6,366,061 B1 | * | 4/2002 | Carley et al. ............... | 323/223 |
| 6,373,671 B1 | * | 4/2002 | Watanabe et al. ........... | 361/93.8 |
| 6,598,170 B1 | * | 7/2003 | Nagashima ................. | 713/340 |
| 6,769,521 B1 | * | 8/2004 | Saito et al. .................... | 191/2 |

* cited by examiner

*Primary Examiner*—Lynn Feild
*Assistant Examiner*—Michael Rutland-Wallis
(74) *Attorney, Agent, or Firm*—Hogan & Hartson, LLP

(57) ABSTRACT

A power supply unit (system power supply IC) has a multiplicity of power supply circuits providing for different supply voltages. Should an abnormal condition take place in any of the multiple power supply circuits, the power supply circuit suffering the abnormality issues an abnormality detection signal that contains a power supply circuit number and an abnormality type, which signal is stored in a nonvolatile memory together with time data indicative of the time of reception of the abnormality detection signal before all the power supply circuits are disabled. Thus, this arrangement protects the system power supply IC and the loads connected thereto, and provides convenient means for analyzing the abnormality and replicating it if necessary, based on the abnormal power supply circuit number, abnormality type and time data stored in the nonvolatile memory.

8 Claims, 4 Drawing Sheets

POWER SUPPLY UNIT HAVING MULTIPLE POWER SUPPLY OUTPUTS

FIELD OF THE INVENTION

The invention relates to a power supply unit having multiple power supply outputs and capable of monitoring abnormal conditions occurring in the unit and protecting the unit from the abnormal conditions.

BACKGROUND OF THE INVENTION

A semiconductor apparatus for providing a multiplicity of power supply voltages (hereinafter referred to as system power supply IC) has been increasingly used as power supply unit in a system which incorporates large scale integrated circuits (LSIs). For example, a system power supply unit IC 400 as shown in FIG. 4 has a multiplicity of voltage regulating circuits (herein after referred to as power supply circuits) 11–1n for supplying a multiplicity of predetermined output voltages Vo1–Von by stepping up or stepping down the voltage supplied thereto. These output voltages Vo1–Von are supplied to external load circuits (not shown) from the output terminals Po1–Pon of the respective power supply circuits 11–1n. Condensers Co1–Con are provided to smooth the respective outputs.

Each of the multiple power supply circuits 11–1n has a monitoring circuit for monitoring internal voltage, current, and temperature of the power supply circuit. If the monitoring circuit detects an over-voltage, over-current, and over-heating for example, the circuit issues an abnormality detection signal indicating that the associated power supply circuit is in abnormal condition.

The system power supply IC 400 also has a circuit (referred to as system-off circuit) 21 receiving such abnormality detection signal from the respective power supply circuits 11–1n.

Upon receipt of an abnormality detection signal from any one of the multiple power supply circuits 11–1n, the system-off circuit 21 is activated to shut down the entire system power supply IC 400, thereby preventing the multiple power supply circuits 11–1n and the loads connected thereto from being destructed.

This conventional system power supply IC 400 does not tell which of the multiple power supply circuits 11–1n has encountered malfunction or what malfunction has taken place in the circuits and has been protected, since the entire system power supply IC 400 is shut down as a protective measure in the event of such abnormality. Therefore, it is often difficult to find the source of the abnormality or to replicate the abnormal condition after the protective shut down of the system power supply IC 400. As a consequence, it could take a long time to recover the system power supply IC 400 or could destruct the system power supply IC 400 while forcibly testing the IC 400 under impermissible conditions.

SUMMARY OF THE INVENTION

It is, therefore, an object of the invention to provide a power supply unit having a multiplicity of power supply outputs, the power supply unit capable of monitoring and protecting from abnormal conditions occurring therein, shutting down the entire power supply unit to protect the unit upon detection of an abnormal condition, and providing means for easily analyzing and/or replicating the abnormality after the protective shut down.

In accordance with one aspect of the invention, there is provided a power supply unit providing a multiplicity of power supply voltages, comprising:

a multiplicity of power supply circuits each providing a predetermined output voltage and capable of issuing at least one abnormality detection signal in response to an abnormal condition occurring therein;

a memory means for storing the abnormality detection signal received from the power supply circuit along with time data indicative of time of reception of the abnormality detection signal; and a system on-off circuit for disabling at least the multiplicity of power supply circuits in response to the abnormality detection signal issued.

In this power supply unit, should an abnormal condition take place in any of the multiple power supply circuits, an abnormality detection signal is issued that contains a circuit number indicative of the circuit suffering the abnormality (the circuit number referred to as abnormal power supply circuit number) and an abnormality type indicative of the abnormality, which signal is stored in a nonvolatile memory together with time data indicative of the time of reception of the abnormality detection signal before all the power supply circuits are disabled. This protects the power supply unit (system power supply IC) and the loads connected thereto. Moreover, the abnormality can be easily analyzed and replicated, if necessary, based on the abnormal power supply circuit number, abnormality type, and time data stored in the nonvolatile memory, thereby enabling quick recovery of the power supply unit. Particularly, when multiple abnormality detection signals are issued, not only the order and time of the abnormalities but also the relevance of the abnormalities can be found.

DESCRIPTION OF THE PREFERRED EMBODIMENTS

The invention will now be described in detail by way of example with reference to the accompanying drawings.

Figure 1:
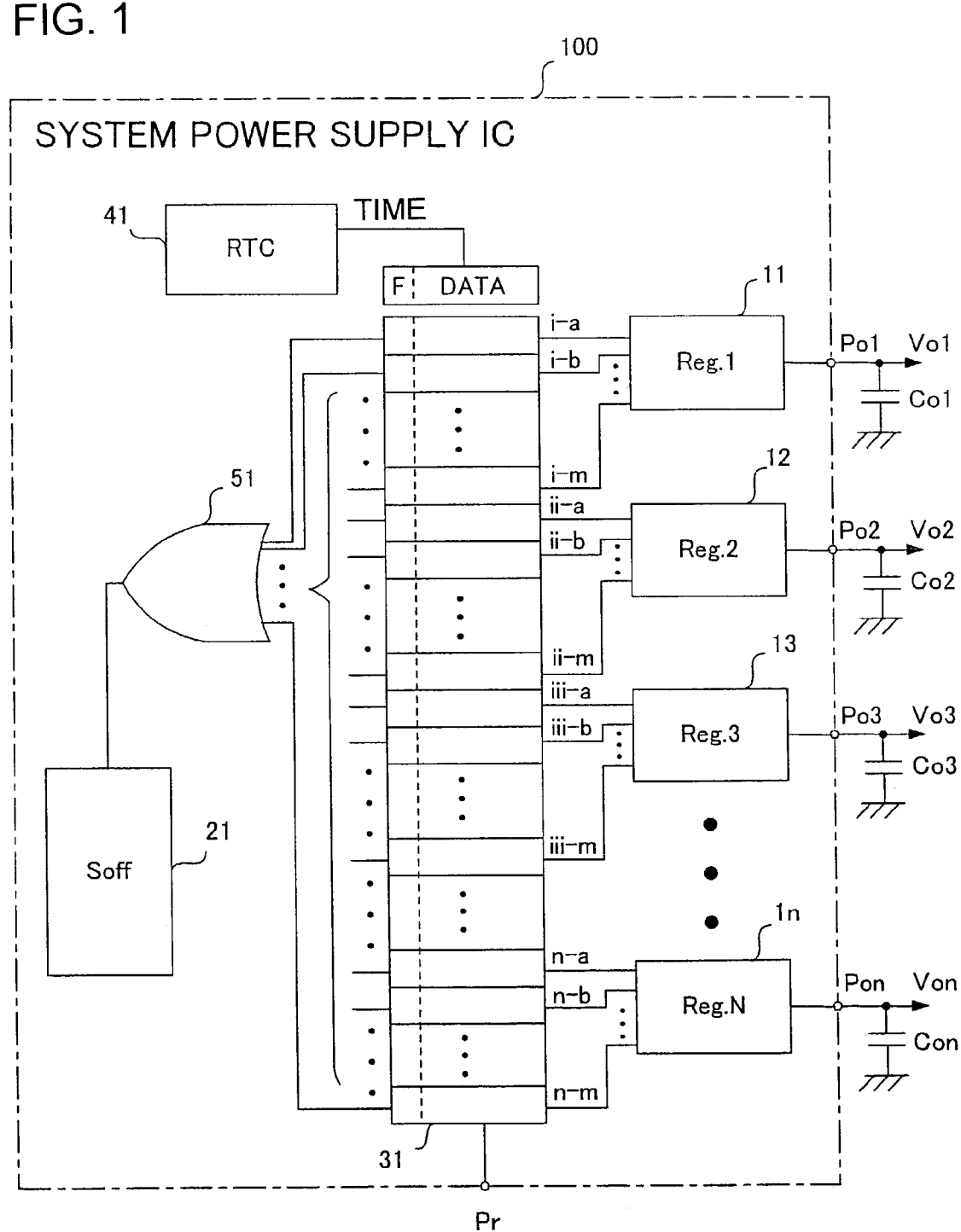
FIG. 1 is a schematic circuit diagram of a first embodiment of a system power supply IC according to the invention.

Referring to FIG. 1, there is shown a first embodiment of a system power supply IC 100 of the invention.

As shown in FIG. 1, the system power supply IC 100 includes a multiplicity of power supply circuits 11–1n. Each of these multiple power supply circuits 11–1n is composed of a series power supply circuit or a step-up (or step-down) switching power supply circuit, for stepping up (or stepping down) a given power source voltage to one of predetermined output voltages Vo1–Von. The output voltages Vo1–Von are provided at the respective output terminals Po1–Pon of the circuits, which output voltages are available to external load circuits (not shown) connected thereto. Smoothing condensers Co1–Con are connected to the respective outputs.

Each of the power supply circuits 11–1n has a monitoring circuit for monitoring its internal input voltage, output voltage, output current and the element temperature inside the circuit. If a monitoring parameter exhibits an excessive or deficient level in one of the power supply circuit 11–1n, an abnormality detection signal is issued by the circuit, indicating that some abnormal conditions e.g. over-current, over-voltage, under-voltage, short circuiting, disconnection, and overheating, have taken place. In the example shown herein, the power supply circuits 11–1n issue abnormality detection signals i-a~n-m, where i–n represent circuit numbers of the abnormal power supply circuits 11–1n suffering the abnormalities, and a–m represent abnormality types involved.

These power supply circuits 11–1n can be individually formed as IC chips that can be coupled to other IC chips.

A real-time clock device (RTC) 41 provides time data TIME that indicates the time of reception of an abnormality detection signal by a memory means 31. However, when time data TIME can be externally supplied to the system power supply IC 100, RTC 41 may be omitted.

A nonvolatile memory 31 can be an EEPROM, a flash memory, or any other nonvolatile memory means so long as it has a sufficient number of memory areas to store the abnormality detection signals i-a~n-m. Each of the memory areas are addressed by the respective abnormality detection signals i-a~n-m. The memory area addressed by an abnormality detection signal also stores time data TIME indicating the time of reception of the abnormality detection signal, and a flag F is set in the memory area to indicate that an abnormality detection signal has been stored therein. Stored data can be retrieved from a read terminal Pr.

The nonvolatile memory 31 is an independent IC chip that can be coupled to other IC chips in a chip-on-chip configuration. Such memory IC chip is available on the market under the name of "Real Socket" (registered trade mark). In this way, the nonvolatile memory 31 is coupled to other IC chips including power supply circuits 11–1n to build a system power supply IC 100 in the form of an LSI.

An OR circuit 51 issues an output signal when a flag F is set in a memory area of the nonvolatile memory 31. The OR circuit 51 can be omitted if the flag(s) is(are) internally ORed within the nonvolatile memory 31.

A system-off circuit 21 disables the system power supply IC 100 when it receives an output signal from the OR circuit 51. For example, the system-off circuit 21 can cut off the very power to the system power supply IC 100, cut off power to the power supply circuits 11–1n, and cut off the outputs of the power supply circuits 11–1n.

Under normal operating conditions, the system power supply IC 100 of FIG. 1 provides predetermined output voltages Vo1–Von generated by the respective power supply circuits 11–1n and supplies them to the respective loads.

If an abnormal condition such as over-current, over-voltage, short circuiting, disconnection of lead wires, and over-heating takes place in any of the power supply circuits 11–1n, the power source or the loads connected thereto, it is detected by the power supply circuit, which circuit then generates a corresponding abnormality detection signal i-a~n-m.

The abnormality detection signal i-a~n-m issued is supplied to and stored in, a memory area of the nonvolatile memory 31 together with time data TIME indicative of the time of reception of the abnormality detection signal. A flag F is set in the memory area.

Upon establishing the flag F in the memory area, the OR circuit 51 generates an output to drive the system-off circuit 21, which when activated cuts off the very power to the system power supply IC 100 to shut down the entire system power supply IC 100.

Thus, all the multiple power supply circuits 11–1n are disabled before they are damaged.

It will be recalled, however, that before the system power IC 100 is shut down, the flag F has been set in the memory area of the nonvolatile memory 31 where the abnormality detection signal i-a~n-m has been stored together with the time data TIME indicative of time at which the abnormality detection signal was supplied to the memory 31.

It is noted that there can be an occasion where a multiplicity of abnormal conditions take place simultaneously in the system power supply IC 100. For example, a short-circuiting may result in an excessive voltage deficiency along with an over-current. Even if such multiple abnormal conditions have taken place in succession in a short period of time, information including the types and occurrence times of the abnormalities is stored in the nonvolatile memory 31 before the system power supply IC 100 is shut down. Since the memory 31 is nonvolatile, it holds the information even after the system power supply IC 100 is shut down.

The information can be retrieved by removing the nonvolatile memory 31 once from the system power supply IC 100 and mounting it on a data read device, or by connecting it to a dedicated data read cable. The information thus retrieved provides the circuit numbers of the power supply circuits that have encountered the abnormalities as well as the abnormality types and the time of occurrence of the abnormalities.

Based on the data thus retrieved, the cause(s) of the abnormalities and their relevance can be easily examined, and the abnormalities can be replicated if necessary. Thus, it is easy to establish a countermeasure against such multiple correlated abnormalities.

It will be appreciated that in the event of such abnormalities information on the abnormal conditions is secured in the nonvolatile memory 31, since the system-off circuit 21 is activated only after a confirmation is made that the information has been stored safely in the memory.

Figure 2:
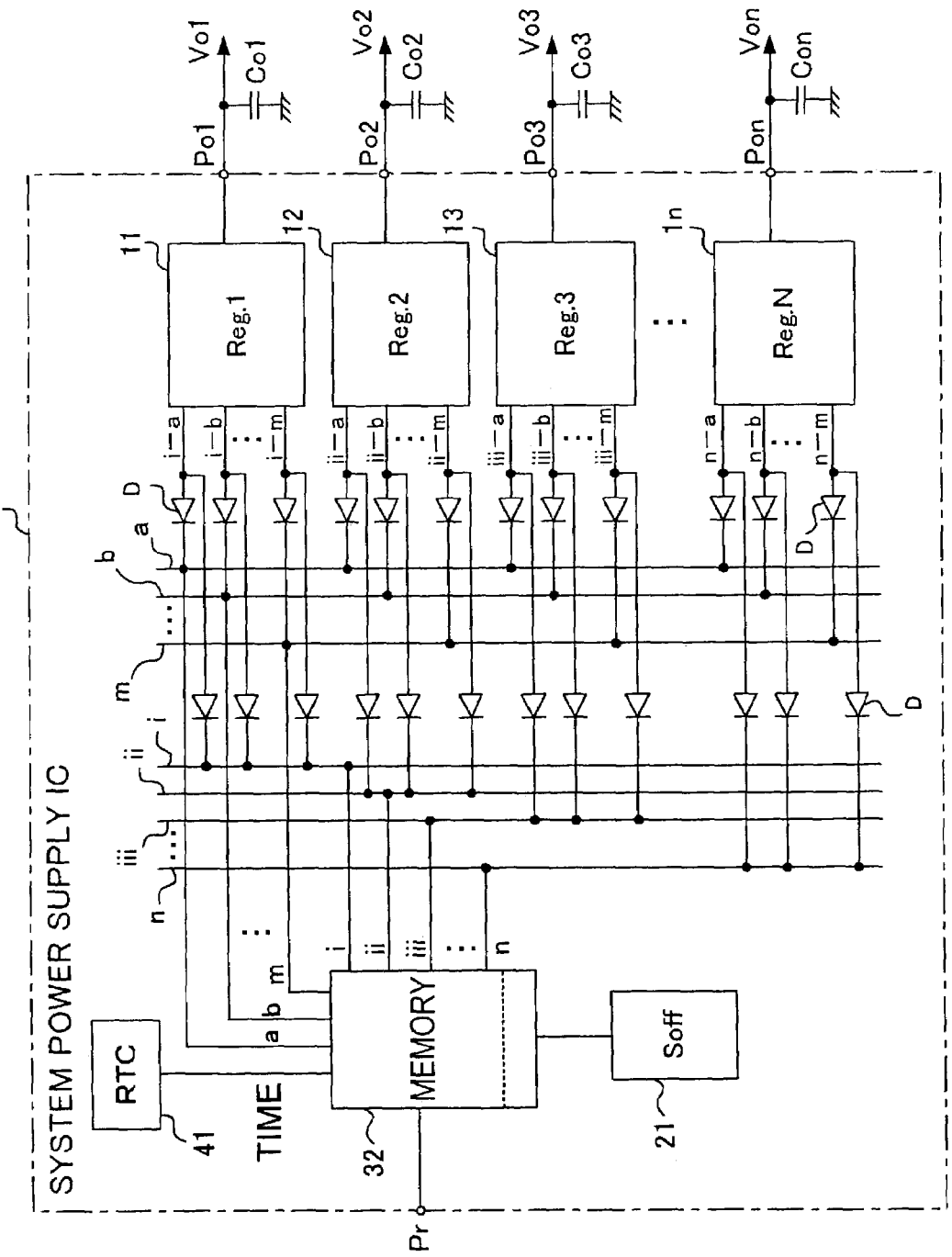
FIG. 2 is a schematic circuit diagram of a second embodiment of a system power supply IC according to the invention.

FIG. 2 shows a structure of a system power supply IC 200 in accordance with a second embodiment of the invention.

In the second embodiment in FIG. 2, information supplied by abnormality detection signals i-a~n-m is stored in a nonvolatile memory 32 in the addresses (or memory areas) determined by the combination of the abnormal power circuit numbers i–n of the power supply circuits 11–1n involved in the abnormalities and the types a–m of the abnormalities.

To do this, a number-type discrimination circuit is provided. This number-type discrimination circuit receives the abnormality detection signals i-a~n-m from the power supply circuits 11–1n and splits each of the signals into two categories (abnormality type signal and abnormal power supply circuit number signal) using two diodes D for each of abnormality detection signals i-a~n-m. One category of the split abnormality detection signals is coupled together to generate groups of abnormality types (referred to as abnormality type groups) a–m, with each group containing split abnormality detection signals belonging to the same abnormality type. On the other hand, another category of the split signals is coupled together to generate groups of abnormal power supply circuit numbers i–n (referred to as abnormal power supply circuit number groups i–n), with each group containing the split signals belonging to the same power supply circuit number. In the example shown herein each of the abnormality detection signals i-a~n-m presumably assumes a high level (HIGH).

The group of abnormal power supply circuit numbers i–n and the group of abnormality types a–m are supplied to the nonvolatile memory 32 as row address signals and column address signals, respectively. Of course, these row and column address signals may be interchanged as column and row signals.

The circuit of FIG. 2 is the same in structure as the circuit of FIG. 1 in other respects that no further details of the second embodiment will be described.

In the second embodiment shown herein, when one of the abnormality detection signals i–a is generated in one power supply circuit, it is split by a diode D into a row signal i and a column signal a, which are supplied to the nonvolatile memory 32. Associated time data is stored in the memory area defined by the row signal i and column signal a, and a flag F is set in the memory area. Storage of these signals is started by one of these signals rising (or falling). Thus, if different abnormality detection signals have the same row signal i or the same column signal a, they can be distinguishably stored.

This ensures unmistakable storage of time data and setting of flags in the memory areas defined by the respective row and column signals even when multiple abnormality detection signals are generated. The system-off circuit 21 is then activated to protect the system power supply IC 200. In the example shown herein, the flag(s) F is(are) ORed within the nonvolatile memory 32.

It will be appreciated that in the second embodiment the number of terminals of the nonvolatile memory 32 can be much less than the number of possible abnormality detection signals m x n, since abnormality detection signals i-a~n-m generated are classified into combinatory groups in accordance with the abnormal power supply circuit number and the abnormality type before they are stored in the nonvolatile memory 32. This feature is advantageous especially when the nonvolatile memory 32 is formed as a single IC chip and later coupled to other IC chips, because a nonvolatile memory is manufactured in a different process than other IC chips.

Figure 3:
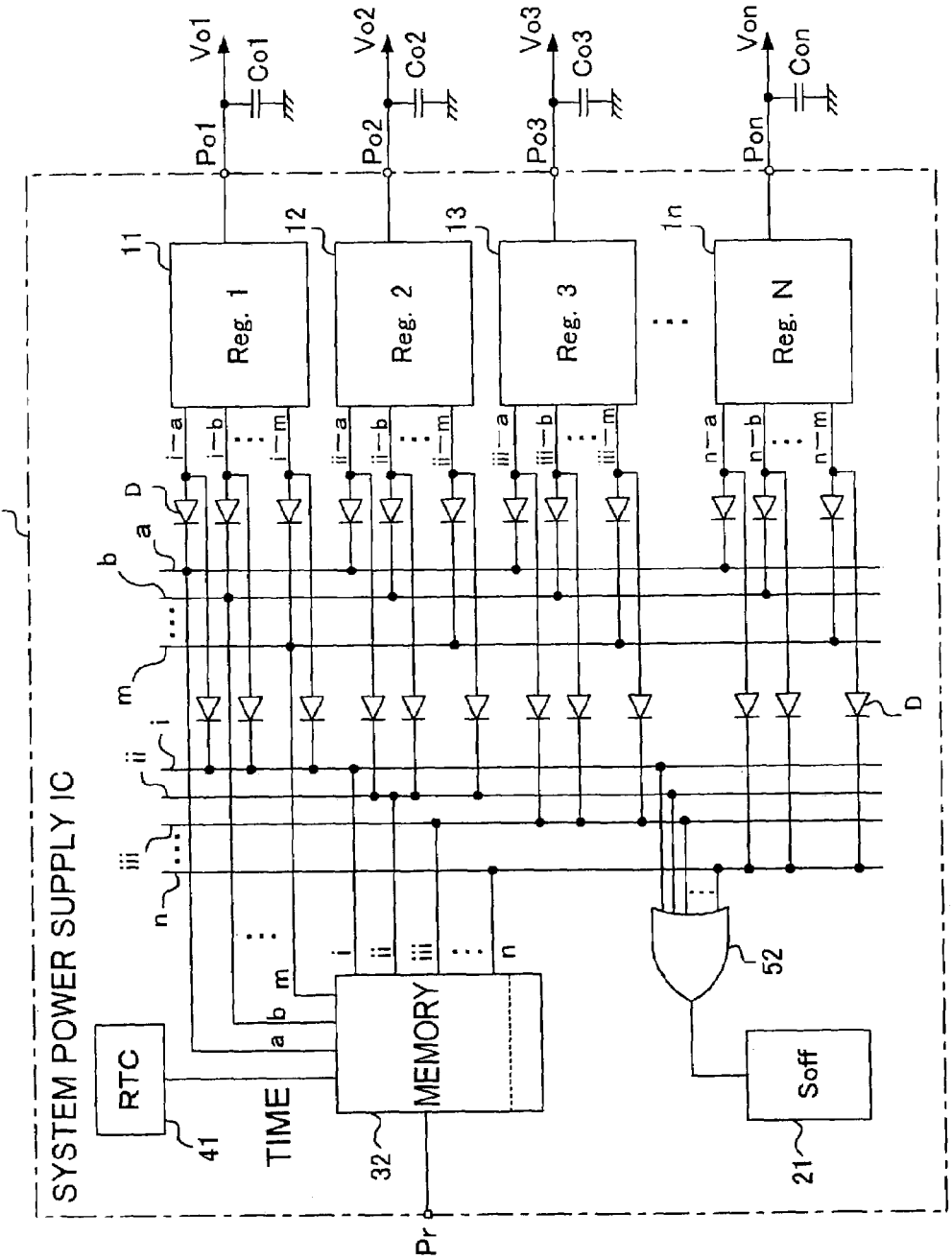
FIG. 3 is a schematic circuit diagram of a third embodiment of a system power supply IC according to the invention.
Figure 4:
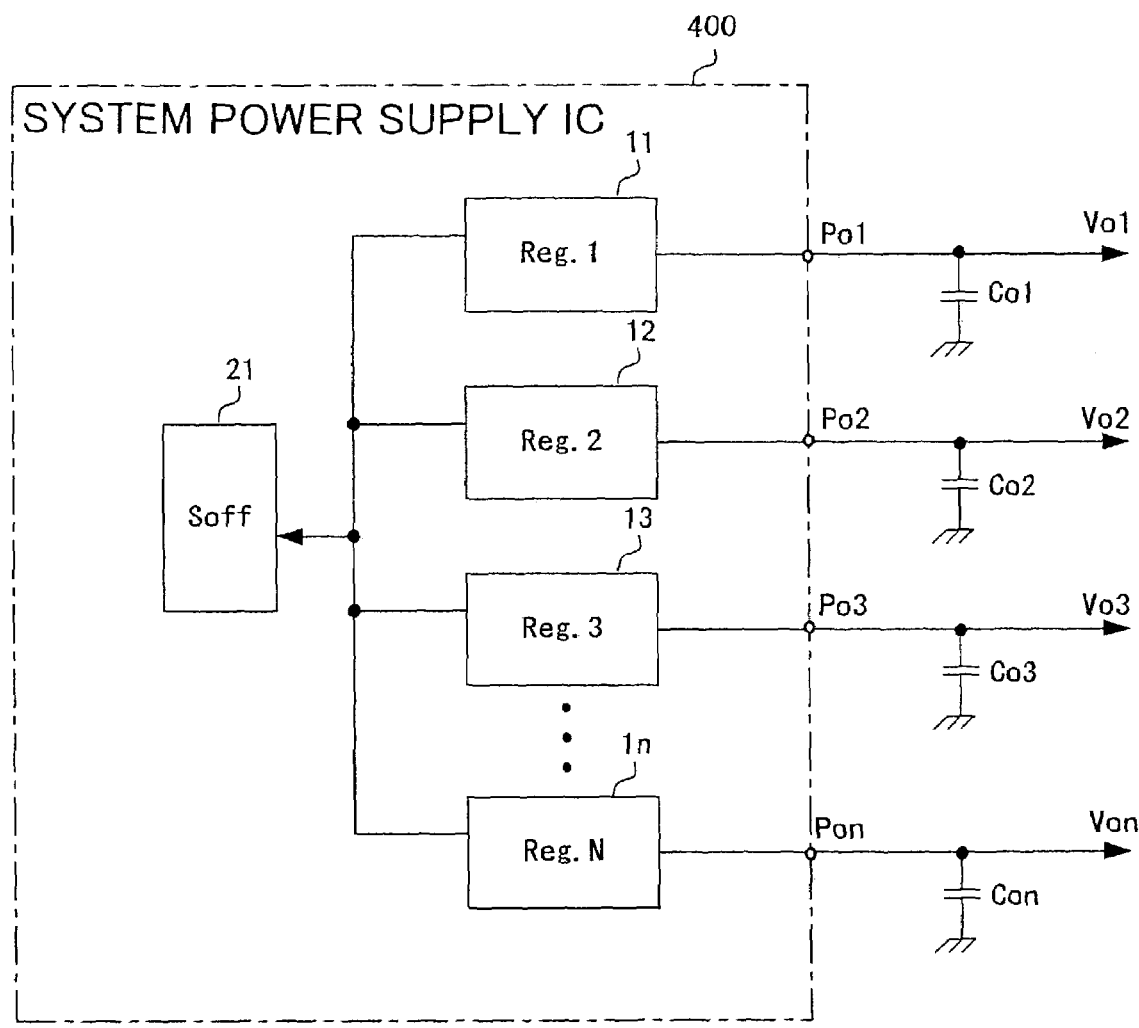
FIG. 4 is a schematic circuit diagram of a conventional system power system IC.

FIG. 3 shows a circuit structure of a power supply circuit IC 300 in accordance with a third embodiment of the invention.

In this embodiment in FIG. 3, the system-off circuit 21 is activated simultaneously with the storage of abnormality detection signals i-a~n-m and occurrence time data associated with the abnormality detection signals in the nonvolatile memory 32.

To do this, abnormal power supply circuit number groups i–n are input to an OR circuit 52, which is adapted to drive the system-off circuit 21. Since any abnormality detection signal i-a~n-m is contained in the abnormal power supply circuit number groups i–n, it suffices to input the power supply circuit number groups i–n to the OR circuit 52. Alternatively, abnormal type groups a–m can be input to the OR circuit 52 in place of the abnormal power supply circuit number groups i–n. In actuality, it is preferable to employ as the input data to the OR circuit 52 the group having a less number of input data.

It is necessary in this embodiment that the storage of the respective abnormality detection signals i-a~n-m in the nonvolatile memory 32 is completed by the time the system-off circuit 21 is activated to shut down the system power supply IC 300. For this reason, when processing time Toff required by the OR circuit 52 and the system-off circuit 21 is shorter than the time (referred to as storage completion time) Tmem necessary to complete storage of all data associated with a detected abnormality into the nonvolatile memory 32, activation of the system-off circuit 21 is delayed to virtually extend the processing time Toff to ensure the storage. Specifically, a timer can be used to delay the activation of the system-off circuit 21.

The circuits of FIG. 3 and FIG. 2 are the same in structure in other respects that no further details of the third embodiment will be described.

It is noted that the system-off circuit 21 of FIG. 1 can be activated, as in the third embodiment in FIG. 3, simultaneously with the storage of abnormality detection signals i-a~n-m in the nonvolatile memory 32 in response to the abnormal conditions. In this instance, the abnormality detection signals i-a~n-m are input to the OR circuit 51 in place of establishing flags F in the nonvolatile memory 31.

In the fourth embodiment (not shown), upon occurrence of an abnormality detection signal, for example i-a, time data is stored in a corresponding memory area of the nonvolatile memory and a flag is set in the same memory area to indicate that the time data is stored. Then, the system-off circuit is activated to shut down the system power supply IC by the initiation of the storage of data associated with the abnormality. Thus, the system power supply IC is shut down earlier by the time allocated for the storage of the abnormality condition in the nonvolatile memory, so that delay in protection of the system power supply IC against the abnormality condition is reduced accordingly.

In the embodiments described above, power supply circuits 11–1n are adapted to monitor a respective abnormal condition to occur in the individual circuits and output respective monitoring data. Alternatively, the power supply circuits 11–1n may be configured to output relevant quantities (such as input and output voltages, output currents, element temperatures, etc. of the components involved) to a separate monitor for monitoring the abnormality conditions occurring in the circuits 11–1n.

In this instance, it is possible to construct the monitor to check not only internal parameters of the power supply circuits 11–1n but also check such quantities (e.g. voltages) that appear at the input and output (I/O) pins of the power supply circuits 11–1n. Therefore, if only the parameters appearing at the I/O pins are monitored, abnormal conditions of the power supply circuits 11–1n can be monitored and stored in a memory without adding any monitoring elements in the respective voltage regulating circuits.

Although it has been assumed in the above description of the embodiments that times of occurrence of abnormal conditions are measured in real time, it will be obvious to those skilled in the art that the abnormal conditions that follow the first one can be recorded as occurring at times with respect to the first one being recorded as occurring at time zero, without influencing at all the merits obtained by the invention.

We claim:

1. A power supply unit providing a multiplicity of power supply voltages, comprising:
   a multiplicity of power supply circuits each providing a predetermined output voltage and capable of issuing at least one abnormality detection signal in response to an abnormal condition occurring therein;
   a memory means for storing each abnormality detection signal received from said power supply circuit along with time data indicative of time of reception of said abnormality detection signal; and
   a system-off circuit for disabling at least said multiplicity of power supply circuits in response to said abnormality detection signal issued,
   wherein said memory means is a rewritable, nonvolatile memory device.

2. The power supply unit according to claim 1, wherein said memory means has a multiplicity of memory areas for storing said abnormality detection signals, with said memory areas addressable by the respective abnormality detection signals.

3. The power supply unit according to claim 2, wherein said system-off circuit is activated upon detection of the storage of at least one abnormality detection signal and associated time data in said memory means.

4. The power supply unit according to claim 2, wherein said system-off circuit is activated by the initiation of the storage of abnormality detection signals and associated time data in said memory means.

5. The power supply unit according to claim 1, further comprising
   a number-type discrimination circuit for splitting each of said abnormality detection signals into an abnormal power supply circuit number signals and an abnormality type signal, wherein
   said memory means has a multiplicity of memory areas each addressable by a combination of said abnormal power supply circuit number and said abnormality type;
   said abnormality detection signals are stored in the respective memory areas in accordance with the abnormal power supply circuit number and the abnormality type.

6. The power supply unit according to claim 5, wherein said system-off circuit is activated upon detection of the storage of at least one abnormality detection signal and associated time data in said memory means.

7. The power supply unit according to claim 5, wherein said system-off circuit is activated by the initiation of the storage of abnormality detection signals and associated time data in said memory means.

8. The power supply unit according to claim 1, further comprising a real time clock device for generating said time data.

* * * * *